May 26, 1959  E. R. KALIS  2,887,971
COMPOSITE DIE
Filed June 24, 1954

Inventor
Edward R. Kalis
By
Attorney

United States Patent Office 2,887,971
Patented May 26, 1959

2,887,971

COMPOSITE DIE

Edward R. Kalis, Dearborn, Mich., assignor to General Motors Corporation, a corporation of Delaware Application June 24, 1954, Serial No. 439,089

5 Claims. (Cl. 113—49)

This invention relates to metal stamping and punching dies and to the process for making same. It has as one of its objects the reduction of tooling costs for the manufacture of stamped metal parts without sacrifice of quality in the finished product.

The cost of tooling for the manufacture of stamped metal parts has always been very high chiefly because of the expense of the all-metal stamping dies in common use. As is well known, conventional matched metal dies for stamping or punching operations must be contoured extremely accurately and thus require great amount of machining. The high cost of such tooling is particularly significant in the automobile industry wherein frequent model changes require a complete re-tooling program. Very often the expense of producing a low production model is prohibitive because of these tooling costs.

It is an object of this invention to provide a solution to the above outlined problem by providing a metal stamping or punching die which is relatively inexpensive, which is durable and which is able to produce parts which are of as high quality and as accurate as those which are produced by the traditional all-metal dies.

These and other objects are carried out in accordance with the invention by the provision of a die, portions of the surface of which are of a hardened plastic with or without filler and the wearing surfaces of which are of wear resistant metal. In manufacturing such a die in accordance with the invention a base member is fitted with metal inserts to provide the wearing surfaces and the plastic material is subsequently molded between the inserts to provide the remaining die surface with the desired contour. For a more precise and exact description of the preferred embodiments of the invention reference is made to the accompanying drawings in which:

Figure 1:
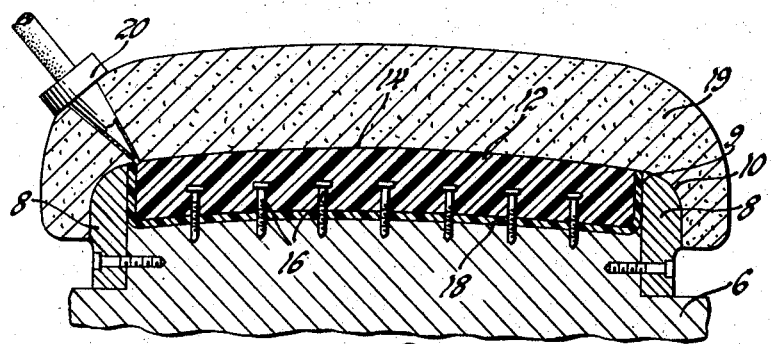
Figure 1 is a sectional view showing the step of molding the plastic surface of the die in accordance with the invention.

Referring now to these drawings, there is shown in Figure 1 a stamping die in its final stage of manufacture and comprising a metal base member 6, having secured thereto a metal insert member 8 which provides wear resistant surface 10 around the periphery of the die and resin insert 12 which forms the inner surface 14 of the die.

In this particular embodiment shown in Figure 1, the die is for the purpose of stamping roof panels. The greatest amount of wear on this type die takes place on the surface adjacent the periphery where most of the metal banding takes place. Thus, in accordance with the present invention, metal insert 8 extends completely around the periphery of the die thereby providing a highly wear resistant surface 10 where it is required. The inner surface 14 of the die where very little metal bending takes place is, in accordance with the invention, made of the moldable and more easily finished plastic material 12.

The metal insert 8, which is of a wear resistant metal such as a steel alloy, may be constructed in a single continuous piece or in a number of pieces which are individually secured to base 6 and to each other thereby forming a continuous insert around the entire periphery of the die. The surface 10 is, of course, accurately machined to form the precise contour desired.

To assist in maintaining the plastic material 12 firmly in place on the surface of the die, a plurality of headed pins 16 may be welded to or threadedly engaged with base member 6. This can best be seen by reference to Figure 2. Additionally, to increase the adhesion between the plastic material 12 and the base 6, an intermediate or bonding layer of suitable plastic material 18 may be provided.

For the plastic insert material 12, I have found most suitable, a composition consisting of catalysed low temperature curing thermosetting rezin containing a filler such as Portland cement. The preferred composition consists of about 100 parts by weight epoxy resin, about 250 parts by weight Portland cement, and about 10 parts by weight catalyst (diethylene triamine). The preferred composition of the intermediate or bonding resin layer 18 consists of about 100 parts by weight epoxy resin, about 50 parts by weight silica flour and about 25 parts by weight catalyst (diethylene triamine).

By low temperature curing thermosetting resin is meant an organic polymeric material which, when catalysed, will cure at about room temperature. An example of such a resin, and that which is preferred, is epoxy which may consist of a condensation product of epichlorohydrin with bisphenol or glycerol. The catalysts for epoxy are usually of the amine type such as diethylene triamine or triethylene tetramine. Such epoxy resins are presently commercially available under the trade name Hysol from Houghton Laboratories, Inc., of Olean, N.Y.

To manufacture the die, the metal base 6 is first fitted with the steel insert 8, the surface 10 of which is accurately machined to provide the desired contour. The insert 8 may be either bolted, welded or otherwise secured to the base member, it being necessary, of course, that there be a very strong bond. The insert 8 in combination with base 6 forms a cavity 9 on the face of the die for reception of the plastic material 12.

A plurality of threaded holes are then formed in the surface of the base member into which headed bolts 16 are theadedly inserted. The surface of the cavity 9 is thoroughly cleaned with any suitable solvent such as alcohol and intermediate layer 18 is applied by brushing, spraying or the like. This intermediate layer is then allowed to cure tack free which requires approximately 1½ hours.

In order to prevent cracking and overheating during operation of the die, it is preferable that the thickness of the plastic insert 12 be between 1 and 1½ inches. In the instance that the depth of any portion of the cavity is greater than 1½ inches, it is preferred to build such portions up with fiberglass matting impregnated with the same material used for the face coating.

An ordinary female Keller setup plaster cast 19 is prepared with a release agent to prevent it from sticking to the plastic face 14 which will subsequently be molded against it. The release agent may consist of three coats of paste wax applied to the plaster face and one coat of liquid wax to harden it. After the wax is dried hard, powdered mica is dusted on and the excess removed with a vacuum cleaner.

This plaster cast 19 is then assembled to the die as shown in Fig. 1 and may be held securely thereto by C clamps (not shown). Plaster saturated hemp (not shown) can be used to form a seal between the die and the cast. Vent boxes and pouring spouts, as indicated at 20, are attached to the plaster cast and all of the joints are sealed with additional plaster saturated hemp. As can be seen in Fig. 1 the inner surface of the plaster cast 19 forms the top of the mold cavity into which the plastic material 12 is poured.

The plastic material for insert 12 must be thoroughly mixed and of uniform consistency. When using the preferred plastic composition as recited above, it is desirable that no more than 50 pounds be mixed at one time. The cement should be added slowly, small amounts at a time, to avoid lumps.

This uniformly mixed plastic composition is poured into the spouts 20 until the air vents are filled; the mixture should be poured slowly to allow the entrapped air to escape through the air vents. After pouring is completed, the plastic is allowed to cure for about 30 to 40 hours then the plaster cast is removed and, after the flash is machined off in any suitable manner, the die is complete and ready to be set up for operation.

Figure 2:
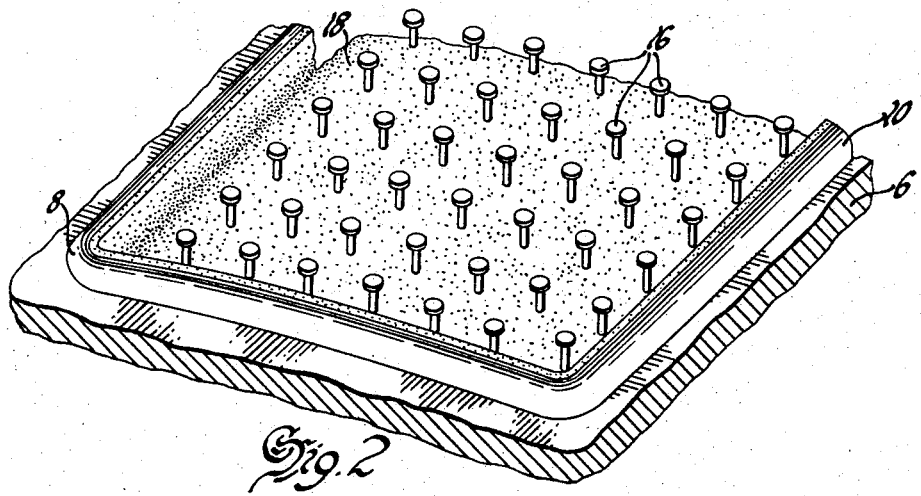
Figure 2 is a perspective view of a portion of the die shown in Fig. 1, but prior to application of the plastic surface thereof.
Figure 3:
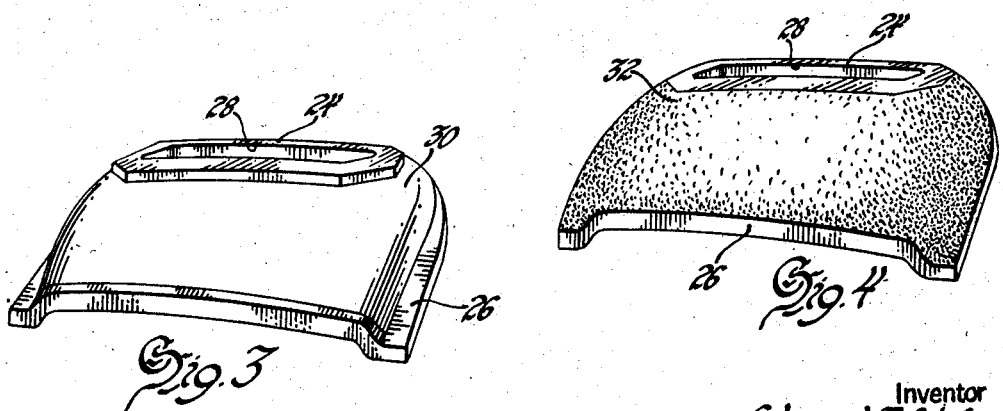
Figure 3 is a view of a metal punching die prior to application of the plastic surface.
Figure 4:
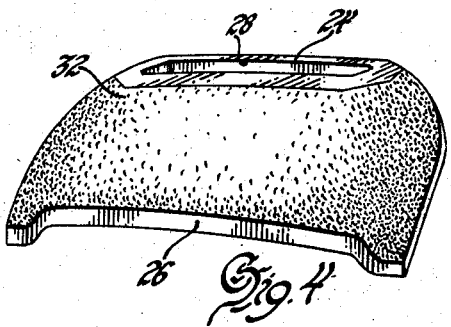
Figure 4 is a view of the punching die shown in Figure 3 but after the plastic surface has been molded.

In Figs. 3 and 4, is shown a metal punching and stamping die suitable for use in making vehicle roof sections containing the back window opening. On such a die it is required that the edge portions of the punching surfaces be of very wear resistant material. Thus, in accordance with the invention, steel inserts 24 and 26 are provided, the former forming the cutting or punching edge 28 and the latter forming the periphery of the die which, as discussed above, in conjunction with the embodiment shown in Figs. 1 and 2, is also subject to wear. Fig. 3 shows the die in process of construction just after inserts 24 and 26 have been secured to base member 30 and Fig. 4 shows the completed die, plastic surface 32 having been molded into place in the manner described above with relation to the embodiment shown in Figs. 1 and 2.

Dies constructed in accordance with this invention are particularly useful for the manufacture of relatively low production stamped and/or punched metal panels and the like. Great time, labor and cost savings may be accomplished without sacrifice in the quality of the finished product.

It is to be understood that, although the invention has been described with specific reference to particular embodiments thereof, it is not to be so limited since changes and alterations therein may be made which are within the full intended scope of this invention as defined by the appended claims.

What is claimed is:

1. A die for sheet metal comprising a base member and a composite working surface for contacting sheet metal, those portions of said working surface most subject to wear being formed of metal members secured directly to said base member and forming a continuous insert about the periphery of said working surface so that the more severe metal working forces on said metal members during the forming operation are transmitted directly to said base member, those portions of said working surface less subject to wear and compressive forces being formed by a body of hardened molded polymeric material containing a filler of Portland cement, said body of material being secured directly to the base member within the confines of said metal members by metal projections attached to the base member and extending into said body of material, and the upper surface of said body of material being continuously contoured and integrally associated with said metal members to form a sheet metal supporting portion of said working surface.

2. A die as defined in claim 1 wherein those portions of said working surface less subject to wear are formed by a body of hardened molded material comprising a mixture of a low temperature curing polymeric thermosetting resin and Portland cement filler.

3. A die as defined in claim 1 and wherein the thickness of said body of material is about 1 inch to 1½ inches.

4. A die as defined in claim 1 and wherein the body of hardened molded polymeric material is a mixture of about 100 parts by weight epoxy resin, about 250 parts by weight Portland cement and about 10 parts by weight catalyst.

5. A die as defined in claim 1 wherein the body of hardened molded polymeric material is a mixture of about 100 parts by weight epoxy resin, about 250 parts by weight Portland cement and about 10 parts by weight catalyst, and having a layer of bonding material between said body of hardened molded polymeric material and said base member, said bonding material containing about 100 parts by weight epoxy resin, about 50 parts by weight silica flour and about 25 parts by weight catalyst.

References Cited in the file of this patent

UNITED STATES PATENTS

| 1,868,788 | Zinser | July 26, 1932 |
| 1,935,916 | Ragsdale | Nov. 21, 1933 |
| 2,016,569 | Zinser | Oct. 8, 1935 |
| 2,186,288 | Gallagher | Jan. 9, 1940 |
| 2,415,788 | Champer | Feb. 11, 1947 |

FOREIGN PATENTS

| 578,397 | Germany | June 13, 1933 |
| 634,855 | Germany | Sept. 4, 1936 |